G. VON PAZSICZKY.
APPARATUS FOR THE PRODUCTION OF SPUN GLASS.
APPLICATION FILED AUG. 25, 1921.
1,427,014. Patented Aug. 22, 1922.
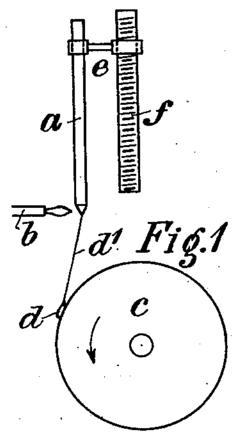
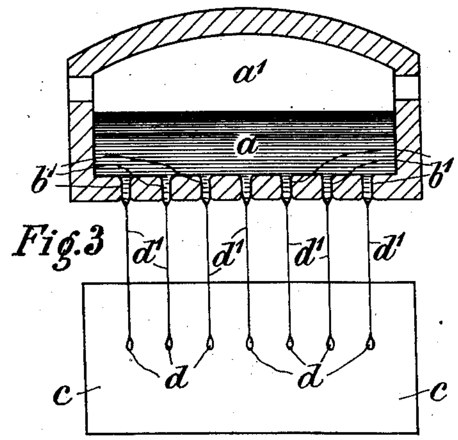
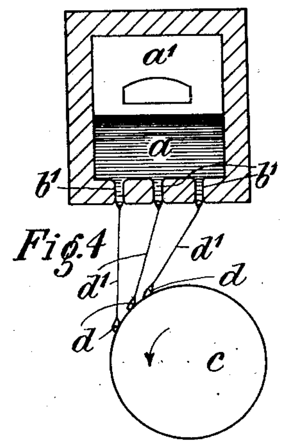
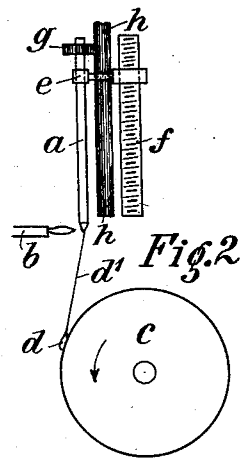
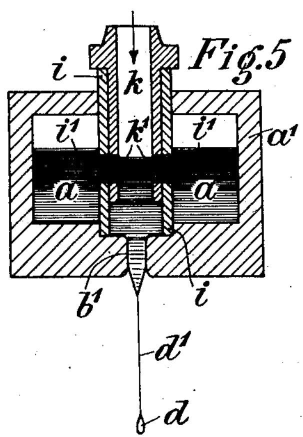
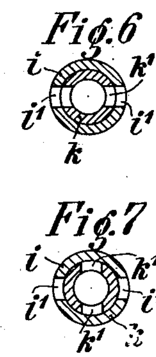
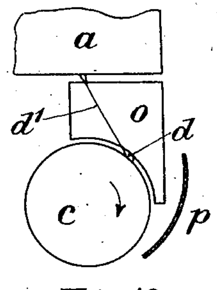
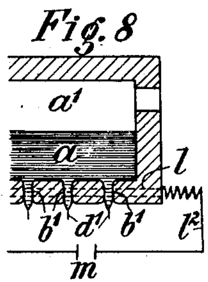
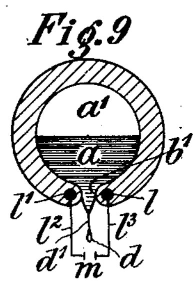
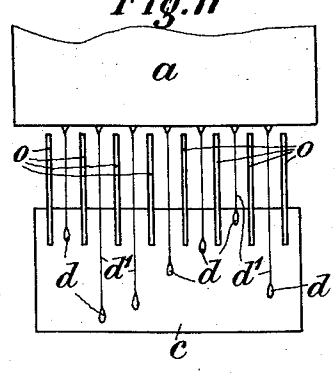
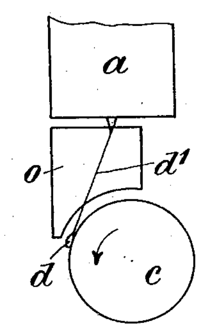
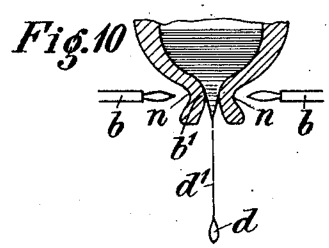
Inventor
G. von Pazsiczky
by [signature] Attorney

UNITED STATES PATENT OFFICE.

GEDEON VON PAZSICZKY, OF HAMBURG, GERMANY.

APPARATUS FOR THE PRODUCTION OF SPUN GLASS.

1,427,014. Specification of Letters Patent. Patented Aug. 22, 1922.

Application filed August 25, 1921. Serial No. 495,229.

*To all whom it may concern:*

Be it known that I, GEDEON VON PAZSICZKY, citizen of the German Republic, residing at Hamburg, Germany, have invented certain new and useful Improvements in Apparatus for the Production of Spun Glass (for which I have filed applications in Germany Apr. 7, 1919; in France Apr. 2, 1920; in Belgium May 5, 1920; in Great Britain January 10, 1921; in Hungary February 6, 1920; in Czecho-Slovakia February 16, 1920; and in Austria January 27, 1920); and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an apparatus for the production of spun glass. According to the invention the molten glass rests stationary and the drop separating from the mass of glass which draws a thread drops in free fall without any additional movement upon the moving surface upon which it sticks whilst the spinning of the thread continues. The drop of glass can come from a glass rod, a glass tube or from any other piece of glass or even from a melting furnace. For the further drawing off of the glass drop or of the glass thread and for the piling up of this glass thread a device of any convenient construction to be operated by hand or mechanically can be used. A device specially adapted for this purpose consists of a revoluble drum or cylinder to which the glass drop adheres so that the glass thread which comes after the drop will be wound around the drum or cylinder or will be piled up on the same.

The apparatus which works in this manner is much simpler than all the devices of known construction which are used for the production of spun glass and with this improved apparatus the spinning which has been interrupted by rupture of the glass thread is restarted automatically.

In order that the invention may be clearly understood, I shall proceed to describe the same with reference to the various forms of construction of the apparatus for the production of spun glass shown by way of example on the accompanying drawing, wherein:—

Fig. 1 shows in side elevation an apparatus of the first form of construction.

Fig. 2 is a similar view of an apparatus of the second form of construction.

Figs. 3 and 4 show respectively in front view and in side elevation an apparatus of the third form of construction.

Fig. 5 is a front view of an apparatus of the fourth form of construction.

Figs. 6 and 7 are cross sections illustrating two different positions of the inner tube.

Figs. 8, 9 and 10 illustrate two forms of construction of an apparatus with artificial heating.

Figs. 11 and 12 show respectively in front view and side elevation an apparatus of a seventh form of construction.

Fig. 13 represents an eighth form of construction of the apparatus.

According to the forms of construction shown in Figs. 1 and 2 the apparatus consists essentially of a glass rod *a*, of a burner *b* and of a drum *c*. The lower end of the glass rod *a* is softened by the flame of the burner *b* so that a drop *d* drops from the end of said glass rod. This glass drop *d* draws a glass thread *d'* after it which, when the glass drop *d* has dropped upon the drum is wound around the revolving drum.

In the apparatus constructed according to these two forms shown by Figs. 1 and 2 the glass rod *a* is held in a holder *e* which is advanced together with said glass rod by a spindle *f* or by any other convenient device towards the flame of the burner *b* at a speed which corresponds with the speed of the melting of the glass rod point.

Whilst according to Fig. 1 the glass rod *a* is merely advanced, it is, according to Fig. 2 revolved at the same time with which object in view a pinion e. g. is arranged at the upper end of the glass rod which gears with a toothed wheel driven in any convenient manner.

The apparatus illustrated by Figures 3 and 4 consists of a receptacle *a'* filled with glass *a* in liquid state. The receptacle has openings *b'* in its bottom. A revoluble cylinder *c* is arranged below said receptacle. The glass drops *d* flowing out of the openings *b'* of the receptacle *a'* draw glass threads *d'* which are wound up around the cylinder $c$ when the drops $d$ have dropped upon the surface of said cylinder.

The glass flows out through the openings $b'$ either by its own weight or with the aid of pressure or suction for which purpose a convenient device, for instance a pressure piston or a suction piston, is connected with the receptacle $a'$.

A form of construction of an apparatus in which pressure is exerted upon the glass mass is shown by way of example in Figs. 5, 6 and 7.

A tube $i$ inserted in the receptacle $a'$ having ports $i'$ encloses a second tube $k$ with ports $k'$. The tube $k$ is revoluble in tube $i$ and it is designed to establish by means of the ports $i'$ and $k'$ a communication between the receptacle $a'$ and the tube $k$ (Fig. 6) or to shut this communication off (Fig. 7). When tube $k$ is in the position shown by Fig. 6 and the communication between $a'$ and $k$ being established the molten glass can flow into tube $k$ and collect in a chamber formed in the lower part of the tube $k$ from which an outlet $b'$ traverses the bottom of the receptacle $a'$. In the position of tube $k$ shown by Fig. 7, that is to say when the communication between $k$ and $a'$ is shut off, the molten glass in tube $k$ is forced out of the outflow $b'$ by a pressure acting in tube $k$ in the direction of the arrow (Fig. 5) so that a drop $d$ flows out to drop upon the revolving cylinder $c$ upon which the glass thread $d'$ is wound.

The receptacle $a'$ can have as many outlets $b'$ as required, which can be arranged in any desired manner, e. g. in one or in several rows. The outflows $b'$ could further be heated as shown in Figs. 8, 9 and 10. According to the form of construction shown in Figs. 8 and 9 an electric heating device is provided. Electrical resistances $l$, $l'$ are arranged at the right and left of the outflows $b'$ to which electric current is supplied from a source of current $m$ by means of the leads $1^2$, $1^3$.

In the form of construction shown by Fig. 10 gas burners $b$, $b$ are used, whose flames act in notches or indentations $n$ of the outflow nozzles $b'$. The dropping out of the drops $d$ and the drawing of the threads $d'$ takes place in the same manner as hereinbefore described. The heating of the outflow nozzles $b'$ favours the separation of the drops from the outflow nozzles $b'$ and the spinning of the threads as the glass can be drawn out best at the hottest point.

In order to prevent that when several rows of outflow nozzles are arranged the drops and their threads when oscillating before they adhere to the cylinder do interfere with the threads in course of being spun and provoke a rupture of these threads vertical partitions $o$ are arranged between the receptacle $a'$ and the cylinder $c$. These vertical partitions are situated between the outflow nozzles $b'$ so that, as can be seen particularly from Fig. 11, the glass threads $d'$ are wound around the cylinder $c$ between the partitions $o$.

Fig. 13 shows a form of construction according to which a transverse partition $p$ is arranged in front of the vertical partitions $o$, the upper end of said transverse partition being further away from the cylinder $c$ than its lower end so that between the transverse partition $p$ and the cylinder $c$ a space is formed which gets narrower towards the lower end. By this transverse partition $p$ and the vertical partitions $o$ nozzles are formed which, when the cylinder $c$ revolves in the direction of the arrow, suck in the air. This suction effect is very favorable for the winding up of the glass threads $d'$.

I claim:—

1. An improved apparatus for the production of spun glass comprising in combination with a stationary mass of molten glass from which drop off the glass drops which draw the glass threads, a revolving drum, upon which said drops fall and around which said glass threads are wound.

2. An improved apparatus for the production of spun glass comprising in combination a receptacle filled with molten glass having outflow orifices in its bottom plate and a revolving cylinder under said receptacle upon whose surface the drops of glass adhere which come out of said orifices and around which the glass threads are wound which are drawn by said drops.

3. An improved apparatus for the production of spun glass comprising in combination a receptacle filled with molten glass having outflow orifices in its bottom plate and several revolving cylinders under said receptacle upon whose surfaces the drops of glass adhere which come out of said orifices and around which the glass threads are wound which are drawn by said drops.

4. An improved apparatus for the production of spun glass comprising in combination a receptacle filled with molten glass having outflow orifices in its bottom plate, a device in said receptacle for measuring off a determined quantity of molten glass, means for exerting a pressure upon the molten glass in said device, and a revolving cylinder under said receptacle upon whose surface the drops of glass adhere which come out of said orifices and around which the glass threads are wound which are drawn by said drops.

5. An improved apparatus for the production of spun glass comprising in combination a receptacle filled with molten glass having outflow orifices in its bottom plate, a vertical tube in said receptacle having inflow ports, a tube revolvably mounted in said vertical tube having inflow ports adapted to register with said inflow ports of the vertical tube so that a determined quantity of molten glass can flow from the receptacle into the inner revoluble tube, means for exerting a pressure upon the molten glass in said inner tube, and a revolving cylinder under said receptacle upon whose surface the drops of glass adhere which come out of said orifices and around which the glass threads are wound which are drawn by said drops.

In testimony whereof I, have signed my name to this specification in the presence of two subscribing witnesses.

GEDEON VON PAZSICZKY.

Witnesses:
ELMER H. L. MUMMENHOFF,
ANNE PATHS.